(12) United States Patent
Shareef et al.

(10) Patent No.: US 9,091,397 B2
(45) Date of Patent: Jul. 28, 2015

(54) SHARED GAS PANELS IN PLASMA PROCESSING CHAMBERS EMPLOYING MULTI-ZONE GAS FEEDS

(75) Inventors: Iqbal Shareef, Fremont, CA (US); Piyush Agarwal, Milpitas, CA (US); Evangelos Spyropoulos, San Jose, CA (US); Mark Taskar, San Mateo, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 312 days.

(21) Appl. No.: 13/549,344

(22) Filed: Jul. 13, 2012

(65) Prior Publication Data

US 2013/0255782 A1  Oct. 3, 2013

Related U.S. Application Data

(63) Continuation-in-part of application No. 13/431,946, filed on Mar. 27, 2012.

(51) Int. Cl.
*E03B 11/00* (2006.01)
*F17D 1/00* (2006.01)

(52) U.S. Cl.
CPC ........................................ *F17D 1/00* (2013.01)

(58) Field of Classification Search
CPC .......... F16K 19/00; F16K 27/003; F17D 1/00
USPC .................... 137/594, 597, 255, 266, 861, 93
See application file for complete search history.

(56) References Cited

U.S. PATENT DOCUMENTS

| 2,225,153 | A | | 12/1940 | Brown |
| 3,830,256 | A | * | 8/1974 | Cox .......................... 137/599.04 |
| 5,605,179 | A | | 2/1997 | Strong, Jr. et al. |
| 5,992,463 | A | | 11/1999 | Redemann et al. |
| 6,302,141 | B1 | | 10/2001 | Markulec et al. |
| 7,169,231 | B2 | * | 1/2007 | Larson et al. .................. 118/715 |
| 7,334,605 | B2 | | 2/2008 | Vu |
| 2004/0185584 | A1 | | 9/2004 | Lin et al. |
| 2005/0087072 | A1 | | 4/2005 | Wodjenski et al. |
| 2006/0272720 | A1 | | 12/2006 | Milburn |
| 2006/0272721 | A1 | | 12/2006 | Milburn |
| 2007/0158025 | A1 | * | 7/2007 | Larson ...................... 156/345.26 |
| 2007/0235085 | A1 | * | 10/2007 | Nakashima et al. .......... 137/240 |
| 2008/0044960 | A1 | | 2/2008 | Al-Bayati et al. |
| 2008/0115834 | A1 | * | 5/2008 | Geoffrion et al. ................. 137/9 |

(Continued)

FOREIGN PATENT DOCUMENTS

| EP | 0675312 A1 | 10/1995 |
| WO | WO2013148473 A1 | 10/2013 |
| WO | WO2013148474 A1 | 10/2013 |

OTHER PUBLICATIONS

PCT International Search Report for PCT/US2013/33371 dated Mar. 21, 2013, 2 pages.

(Continued)

*Primary Examiner* — Jessica Cahill (57) ABSTRACT

Apparatus and methods for sharing a gas panel among a plurality of multi-zone gas feed chambers of a plasma processing chamber. Each multi-zone gas feed chamber is provided with its own multi-zone gas feed device to adjustably split the incoming gas flow into each chamber and provide the different gas flows to different zones of the multi-zone gas feed chamber.

10 Claims, 9 Drawing Sheets

(56) References Cited

U.S. PATENT DOCUMENTS

| | | |
|---|---|---|
| 2008/0233022 A1* | 9/2008 | Ryabova et al. ............ 422/240 |
| 2009/0114295 A1 | 5/2009 | Milburn et al. |
| 2009/0142930 A1 | 6/2009 | Hammond, IV et al. |
| 2010/0200071 A1 | 8/2010 | Morgan |
| 2010/0224322 A1 | 9/2010 | Sui et al. |
| 2011/0265549 A1 | 11/2011 | Cruse et al. |
| 2011/0265831 A1* | 11/2011 | Lee et al. ................. 134/30 |
| 2011/0265951 A1 | 11/2011 | Xu et al. |
| 2011/0266256 A1* | 11/2011 | Cruse et al. ............. 216/59 |
| 2011/0269314 A1 | 11/2011 | Lee et al. |
| 2012/0097266 A1 | 4/2012 | Cobb et al. |
| 2013/0092243 A1* | 4/2013 | Mohammed et al. ......... 137/2 |
| 2013/0104996 A1* | 5/2013 | Oh et al. ..................... 137/2 |
| 2013/0255782 A1 | 10/2013 | Shareef et al. |

OTHER PUBLICATIONS

PCT International Search Report for PCT/US2013/33373 dated Mar. 21, 2013, 2 pages.

* cited by examiner

FIG. 8

SHARED GAS PANELS IN PLASMA PROCESSING CHAMBERS EMPLOYING MULTI-ZONE GAS FEEDS

PRIORITY CLAIM

This patent application claims priority under 35 USC 120 to and is a continuation-in-part of a previously filed patent application entitled "SHARED GAS PANELS IN PLASMA PROCESSING SYSTEMS", application Ser. No. 13/431, 946, filed Mar. 27, 2012, which is incorporated by reference herein.

BACKGROUND OF THE INVENTION

Substrate processing systems have long been employed to process substrates to produce electronic devices (such as integrated circuit dies or flat display panels or solar panels). In a modern substrate processing system, multiple process modules (Mk) may be provisioned per system. This is commonly known as the clustered tool approach, and a cluster tool is commonly understood to include multiple processing modules for processing multiple substrates in parallel.

Generally speaking, each process module is configured to process one or more substrates in accordance with the same or different recipes/processes. Since the processing of substrates typically requires a plurality of process gases (such as etching or deposition or tuning gases), each process module (or chamber, as the term "chamber" is used interchangeably with "process module" herein) is typically provisioned with its own gas panel in the past in order to selectively provide a set of required process gases to the process module to execute a desired recipe.

To elaborate, a gas panel represents the arrangement that performs the function of receiving the plurality of process gases, selectively providing selective gases of the plurality of process gases to the process module in accordance with parameters specified by the recipe. These parameters may include one or more of volume, pressure, and temperature, for example.

Gas panels are, however, fairly bulky and are relatively expensive items to purchase, operate, and maintain. A typical gas panel includes a plurality of input and output gas lines, a plurality of valves for volume/pressure control and for safety/isolation of the individual process gases and associated sensor/control/communication electronics. The typical gas panel also typically includes a mixing manifold for mixing the process gases prior to supplying such process gases to the process module. The large number of components increases the cost to acquire, operate, and maintain the substrate processing system.

Furthermore, some plasma processing chambers, such as dielectric etch chambers, require multiple gas feeds to different regions or zones of the chamber. In an example dielectric etch tool that employs dual zone gas feeds, the recipe may specify that 60% of the process gas be directed to the center zone and 40% of the process gas be directed to the edge zone. A subsequent recipe in the same chamber may specify that 72% of the process gas be directed to the center zone and 28% of the process gas be directed to the edge zone. A commercially viable dielectric etcher that employs multi-zone gas feed needs to accurately accommodate a range of ratios for the various zones as specified by different recipes.

Reducing the cost of acquiring, operating, and maintaining substrate processing systems by simplifying and/or reducing the number of gas panels while still efficiently accommodating the multi-zone gas feed requirement for individual chambers

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, optomagnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various Embodiments of the invention relate to methods and apparatus for reducing the number and size of gas panels in a substrate processing system. In one or more embodiments, it is realized by the inventors herein that if substrate processing systems are constructed and best practices are established such that if multiple process modules of the same cluster tool carry out the same recipe at the same time to execute the same process on different substrates in these different process modules, it is unnecessary to provide each such process module with an independently controllable gas box. In an embodiment, multiple process modules share a gas panel, thereby reducing the number of components that need to be purchased and maintained. Each shared gas panel (SGP) can service two or more process modules simultaneously.

More importantly, embodiments of the invention involve arrangements and techniques to minimize the volume occupied by components of the shared gas panel (SGP). For example, embodiments of the invention involve staggering the mixing manifolds such that multiple mixing manifolds can occupy the same footprint as one prior art manifold. This is important since modern safety requirements specify that components of a gas panel (such as valves, mass flow controllers, vas line connectors) be isolated from the ambient environment by a containment structure. The air in the containment structure is constantly pumped out and scrubbed (i.e., processed to remove or render relatively harmless any gas that may be leaked from the gas panel components). In an example gas panel currently in use, about 150 CFM (cubic feet per minute) of containment structure air needs to be pumped and scrubbed every minute. This pumping and scrubbing needs to be performed whenever the cluster tool is in operation and contributes in a non-trivial way to the cost of owning and operating the cluster tool when a large number of high volume gas panels are involved.

If fewer gas panels are employed in the cluster tool, less containment structure air needs to be pumped and scrubbed, thereby reducing the cost of tool ownership. Furthermore, if the inventive shared gas panel (SGP) that services multiple process modules can be kept small in volume such that the components of the shared gas panel fit in a smaller containment structure, less containment structure air needs to be pumped and scrubbed, thereby reducing the cost of owning and operating the cluster tool. With fewer gas panels and gas containment structures, the probability of gas leak to the environment may also be reduced.

In an embodiment, there is provided an apparatus for supplying selective process gases to a set of process modules that includes at least two process modules. The apparatus includes a gas evacuation containment structure (i.e., a containment structure that isolates the components within the containment structure from the ambient environment and is configured to have its interior air frequently or constantly evacuated to a treatment system). Within the containment structure, there are provided a plurality of 3-port mixing valves. Each 3-port mixing valve includes an input port, a first output port, and a second output port.

The process gases are selectively supplied to the input ports of the mixing valves using a plurality of upstream primary valve and/or mass flow controllers. If an upstream primary valve and/or mass flow controller shuts off, the process gas associated with the gas line on which the upstream primary valve and/or mass flow controlled is closed does not get delivered to an input port of a mixing valve and is not used in the processing of the substrate.

In an embodiment, in each 3-port mixing valve, the input port is coupled to both the first output port and the second output port such that when the 3-port mixing valve is on, the input port provides gas to both the first output port and the second output port. When the 3-port mixing valve is off, the input port stops providing gas to both the first output port and the second output port.

In another embodiment, in each 3-port mixing valve, the input port is selectively coupled to both the first output port and the second output port such that when the 3-port mixing valve is on, the input port provides gas (depending on a control input, which may be pneumatic, hydraulic; or electrical) to 1) both the first output port and the second output port, or 2) only the first output port, or 3) only the second output port. When the 3-port mixing valve is off, the input port stops providing gas to both the first output port and the second output port. The first output ports of the mixing valves are coupled to the plurality of input ports of a first mixing manifold, while the second output ports of the mixing valves are coupled to the plurality of input ports of a second mixing manifold. The first mixing manifold represents the shared gas manifold within which process gases from various first output ports of various mixing valves are mixed before being delivered via a first mixing manifold output port to the first process module of the cluster tool. The second mixing manifold represents the gas manifold within which process gases from various second output ports of various mixing valves are mixed before being delivered via a second mixing manifold output port to the second process module of the cluster tool. Although only a 3-port mixing valve and 2 mixing manifolds are discussed in the example herein, it should be understood that it is also possible to have a 4-port mixing valve (1 input port and 3 output ports) working with 3 mixing manifolds, or a 5-port mixing valve (1 input port and 4 output ports) working with 4 mixing manifolds, and so on. In an embodiment, the first mixing manifold and the second mixing manifold are oriented in parallel such that their longitudinal axis are parallel to a first direction or such that their manifold input ports generally line up parallel to the first direction. In an embodiment, each of these mixing manifolds assumes the general shape of a tubular length having a longitudinal dimension and a cross section. The cross-section may be circular or may be square or rectangular or any other enclosed shape. The longitudinal dimension forms an axis that is parallel to the aforementioned first dimension in this embodiment.

Each set of three ports that includes the input port, the first output port, and the second output port of each mixing valve are lined up in a line that is parallel to a second direction. More importantly, the second direction is at an angle with the first direction with which the mixing manifolds are oriented. As the term is employed herein, the second direction is deemed to be "at an angle" with the first direction when the second direction is neither orthogonal nor parallel to the first direction. By staggering the mixing manifolds and thus angling each mixing valve such that its input port, first output port, and second output port line up in a direction that is at an angle with the first direction with which the mixing manifolds are oriented, the mixing manifolds may be placed closer together, thereby reducing, the volume of the components of the shared gas panel and concomitantly reducing the volume of the containment structure that houses these components. In some cases, multiple mixing manifolds can occupy the same footprint formerly employed to accommodate a prior art manifold.

In an embodiment, the mixing valves occupy a given plane. The first mixing manifold is disposed on a first plane under the mixing valves plane, while the inlet lines that supply the process gas to the mixing valve input ports are placed on a second plane under the mixing valves, with the second plane being disposed between the first plane and the mixing valves.

In an embodiment, both the first mixing manifold and the second mixing manifold are disposed on the first plane under the mixing valves while the inlet lines that supply the process gas to the input ports of the mixing valves are placed on a second plane under the mixing valves plane, with the second plane being disposed between the first plane and the mixing valves plane. By stacking various components in different vertical planes, the volume of the components of the shared gas panel may be further reduced.

The features and advantages of embodiments of the invention may be better understood with reference to the figures and discussions that follow.

Figure 1:
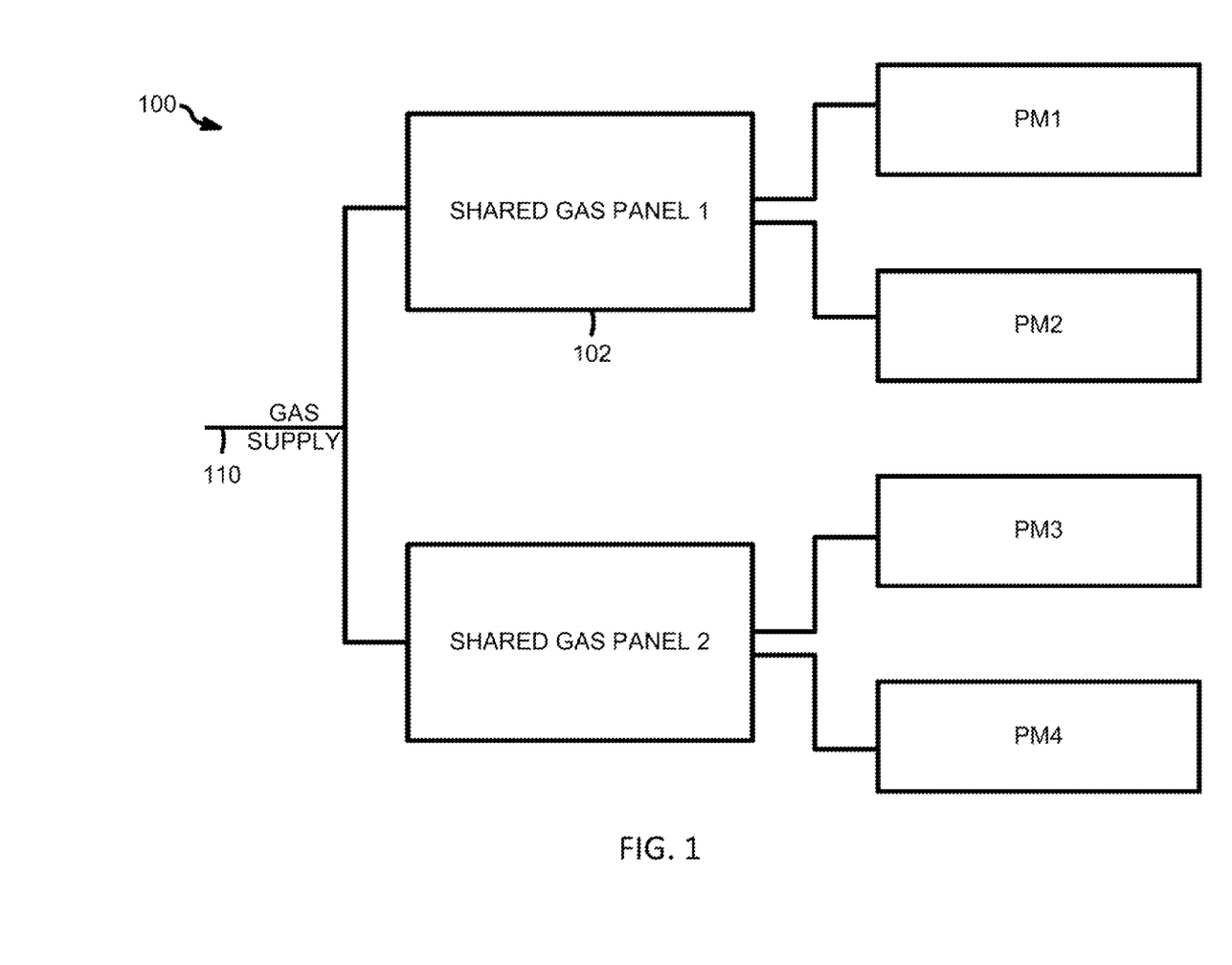
FIG. 1 shows, in accordance with an embodiment of the invention, an arrangement for supplying process gases to a set of process modules of a cluster tool.

FIG. 1 shows, in accordance with an embodiment of the invention, an arrangement for supplying process gases to a set of process modules PM1-PM4 of a cluster tool 100. A gas supply 110 is shown providing process gases to Shared Gas Panel 1 and Shared Gas Panel 2. Generally speaking, the gas supply includes multiple gas lines, each of which may provide one specific process gas from the gas supply store (such as a storage tank via appropriate supply tubing). Shared Gas Panel 1 is shown supplying process gas(es) to both process modules PM1 and PM2. In an embodiment, PM 1 and PM 2 both execute the same recipe. In another embodiment, PM 1 and PM2 may execute different recipes.

Although only two shared gas panels are shown in the example of FIG. 1, a cluster tool may include any number of shared gas panels and individual (one-per-process-module) gas panels or any mixture thereof. Further, although two process modules per shared gas panel are shown, a shared gas panel may supply process gas(es) to as many process modules as desired. Further, although only four process modules are shown, a cluster tool may have as many process modules as desired. Shared Gas Panel 1 is shown with a gas evacuation containment structure 102, representing the environmental enclosure for isolating the components of the shared gas panel from the ambient environment. In use, the gas within gas evacuation containment structure 102 is evacuated periodically or continually (using pumps, for example) for treatment (such as scrubbing).

Figure 2:
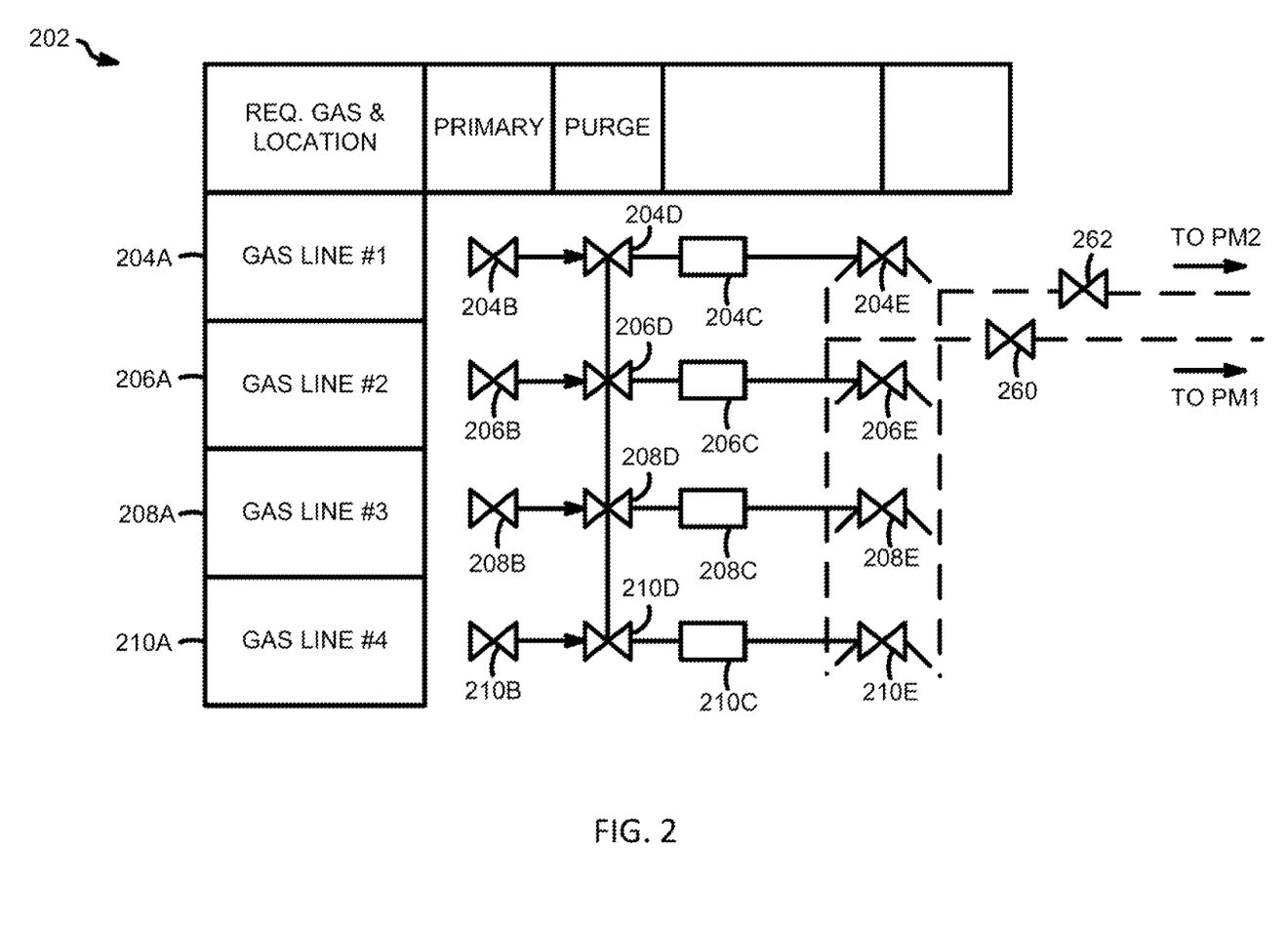
FIG. 2 conceptually shows, in accordance with an embodiment of the invention, some relevant components within a shared gas panel (SGP).

FIG. 2 conceptually shows, in accordance with an embodiment of the invention, some relevant components within a shared gas panel (SGP) 202, such as shared gas panel 1 of FIG. 1. SGP 202 is shown receiving four process eases through four gas input lines 204A, 206A, 208A, and 210A although a typical SGP may receive 17 or more gases (the number of gas input lines may vary as desired). Each of gas input lines 204A, 206A, 208A, and 210A is coupled to a respective primary valve 204B, 206B, 208B, and 210B. Each primary valve may be programmatically controlled to select which process gas may be provided to the mixing manifolds 250 and/or 252 (to be discussed later). A set of purge valves 204D, 206D, 208D, and 210D, which is part of a purging system, are also shown although purge valves and purge systems are conventional and are not part of the present invention.

Mass Flow Controllers (MFC) 204C, 206C, 208C, 210C are in gaseous communication with primary valves 204A, 206A, 208A, and 210A to selectively receive input process gas from the primary valves (depending on which primary valve is open). As is well known, a mass flow controller is employed to regulate (including shutting off) the flow rate and/or pressure of the gas delivered. Downstream of the mass flow controllers are the mixing valves, each of which is in gaseous communication with a respective mass flow controller. In the example of FIG. 2, there are two mixing manifolds 250 and 252 coupled in gaseous communication with each of mixing valves 204E, 206E, 208E, and 210E. Since each mixing valve has one input port for receiving a process gas from its respective manifold (e.g., mixing valve 204E receiving process gas from MFC 204C and mixing valve 208E receiving process gas from MFC208C and two output ports for coupling to the two mixing manifolds 250 and 252, each mixing valve is thus a 3-port valve (one input port and 2 output ports). Mixing valves 204E-210E may be pneumatically operated, electrically operated, mechanically operated, or hydraulically operated, for example.

Mixing manifold 250 receives its input gas(es) via the mixing valves and mixes the process gas(es) before delivering the process gas(es) to its process module PM 1 via an isolation valve 260. Likewise, mixing manifold 252 receives its input gas(es) via the mixing valves and mixes the process gas(es) before delivering the process gas(es) to its process module PM 2 via an isolation valve 262. Isolation valves isolate the process modules from the gas panels and are employed for volume/flow control purposes during processing and maintenance, for example.

In the example of FIG. 2, the mixing valves are single-input-two-common-outputs valves. In other words, when the valve is open, gas from the input port is provided to both output ports simultaneously. In this case, each mixing valve is essentially a splitter valve and both mixing manifolds 250 and 252 will receive the same type of process gas(es).

In other embodiments, the mixing valve may, as discussed earlier, selectively provide gas from its input port to any one of the output ports, any combination of output ports, or to all output ports. With this capability, it is possible to have different mixtures in mixing manifolds 250 and 252 to execute different recipes in the two process modules associated with SGP 202, for example. As mentioned, more than 2 output ports may be provided per mixing valve if there are more than 2 mixing manifolds and/or more than 2 process modules.

Figure 3:
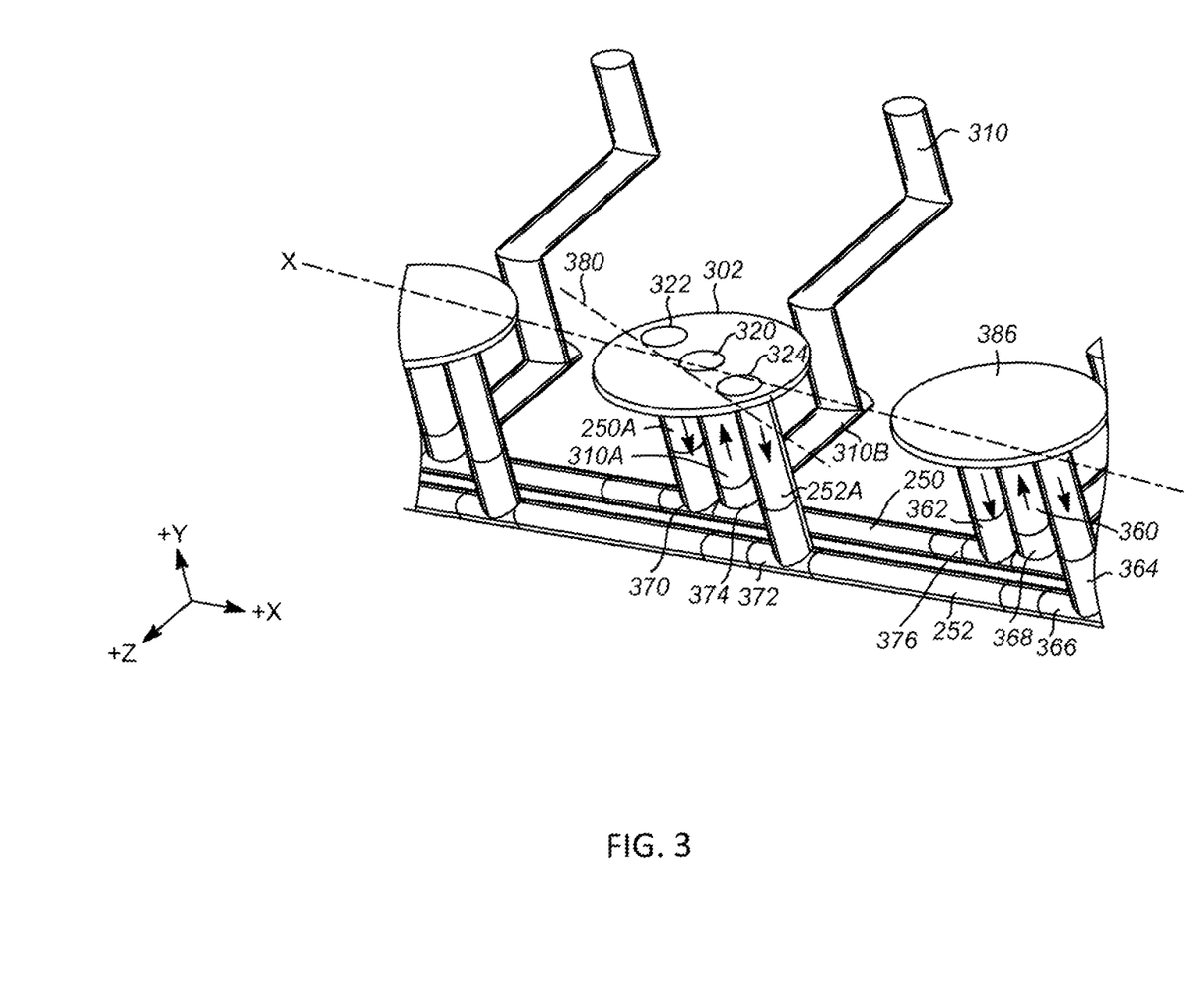
FIG. 3 shows the spatial arrangements of some relevant components of the shared gas panel in accordance with one or more embodiments of the invention.

In accordance with an embodiment, the mixing manifolds are disposed under the mixing valves in order to save space and to reduce the volume within the containment enclosure. This is best seen in FIG. 3 wherein mixing manifolds 250 and 252 are disposed under plane portion 302, representing a portion of a plane at which the mixing valve flange (402 of FIG. 4) may be disposed. In FIG. 3, mixing manifolds 250 and 252 occupy the same plane in the Y dimension under the mixing valve. Further, gas line portion 310 that is coupled to the input port (marked with reference number 310A) occupies, at its bottom end, a different plane in the Y-dimension that is higher than the Y-dimension plane occupied by the mixing manifolds 250 and 252. In other words, the input gas line (whether is vertical portion or the circumference of its horizontal portion) does not extend downward to the plane occupied by mixing manifolds 250 and 252. By displacing the space-occupying gas lines vertically and also from the mixing valves themselves, it is possible to squeeze mixing manifolds 250 and 252 closer together (in the Z dimension in the example of FIG. 3) to save space. Accordingly, less horizontal space (in the X-Z plane of FIG. 3) is required, leading to reduced SGP volume. This is particularly true for industry-standard rectangular box-shaped enclosures since the height of such an enclosure is typically governed by its tallest component. If components are spread-out in the X-Z plane, not only would the footprint be unduly large but a lot of interior volume space would have been wasted as a result.

In the example of FIG. 3, a process gas is provided via gas line 310 and travels upward portion 310A in the +Y direction to the input port of the mixing valve via hole 320 (hole 320 represents an imaginary cut-away aperture in gas line portion 310A for illustration purposes). If the mixing valve is open, the process gas will be distributed to one or both of output ports by traveling down one or both of holes 322 and/or 324 in the −Y direction. Holes 322 and 324 represent imaginary cut-away apertures in gas line portions 250A and 252A (which are in gaseous communication with mixing manifolds 250 and 252 respectively) to be mixed in manifolds 252 and 250 respectively.

As can be seen in the example of FIG. 3, gas is provided to the mixing manifolds 252 and 250 from portions 252A and 250A via T-couplings 372 and 370. Gas is provided to the input port of the mixing valve (by traveling up portion 310A) via an L-coupling 374. A short horizontal portion 310B is employed to provide the input gas in a plane that is higher (more positive in the Y direction) than the plane occupied by the mixing manifolds 250 and 252).

In one or more embodiments, the tubing lengths, number of turns, and/or the tubing construction/diameters of the two gas paths from the two mixing valve outlet ports to its two mixing manifold are kept as similar as possible to ensure that each mixing manifold receive the same mass flow from the MFC with the same pressure, gas velocity, and concentration. In one or more embodiments, these gas paths may be optimized with different tubing lengths, number of turns, and/or tubing diameters/construction to ensure that each mixing manifold receive the same mass flow from the MFC with the same pressure, gas velocity, and concentration.

FIG. 3 also shows another process gas provided via L-coupling 368 and gas line 360 to another mixing valve coupled to plane portion 386 and distributed to the two mixing manifolds 250 and 252 via lines 362 and 364.

FIG. 3 shows mixing manifolds 250 and 252 oriented along direction X such that its input ports line up along the same direction X. Thus, input ports of manifold 252 (i.e., the upward pointing portions of T-couplings 366 and 372) that couple to portions 364 and 252A respectively line up parallel to direction X of FIG. 3 (also direction X of FIG. 5). Similarly, input ports of manifold 250 (i.e., the upward pointing portions of T-couplings 370 and 376) that couple to portions 250A and 362 respectively line up parallel to direction X of FIG. 3. Similarly, input ports of the mixing valves (i.e., the upward pointing portions of L-couplings 374 and 368) that couple to portions 310A and 360 respectively line up parallel to direction X of FIG. 3. Since each mixing manifold has a long dimension (e.g., longitudinal dimension in the case of a tubular structure such as those shown in FIG. 3) and a cross section (e.g., a round or some other polygonal cross section in the case of a tubular structure), the long dimension of the mixing manifold represents the mixing manifold direction herein. In the example of FIG. 3, this mixing manifold direction is also in the direction +/−X.

The three input/output ports (or at least one input port and 1 output port) of each mixing valve line up in a direction that is at an angle with direction X of FIG. 3. In the example of FIG. 3, the input port for the mixing valve that is coupled plane portion 302 occupies the positions denoted by reference number 320. The two output ports for the mixing valve that is coupled to plane portion 302 occupy the positions denoted by reference numbers 322 and 324. As can be seen holes 320, 322, and 324 line up along the direction of line 380, which is at an angle (i.e. other than orthogonal or parallel) to the X direction (i.e., the mixing manifold direction or the mixing manifold longitudinal direction).

Figure 4:
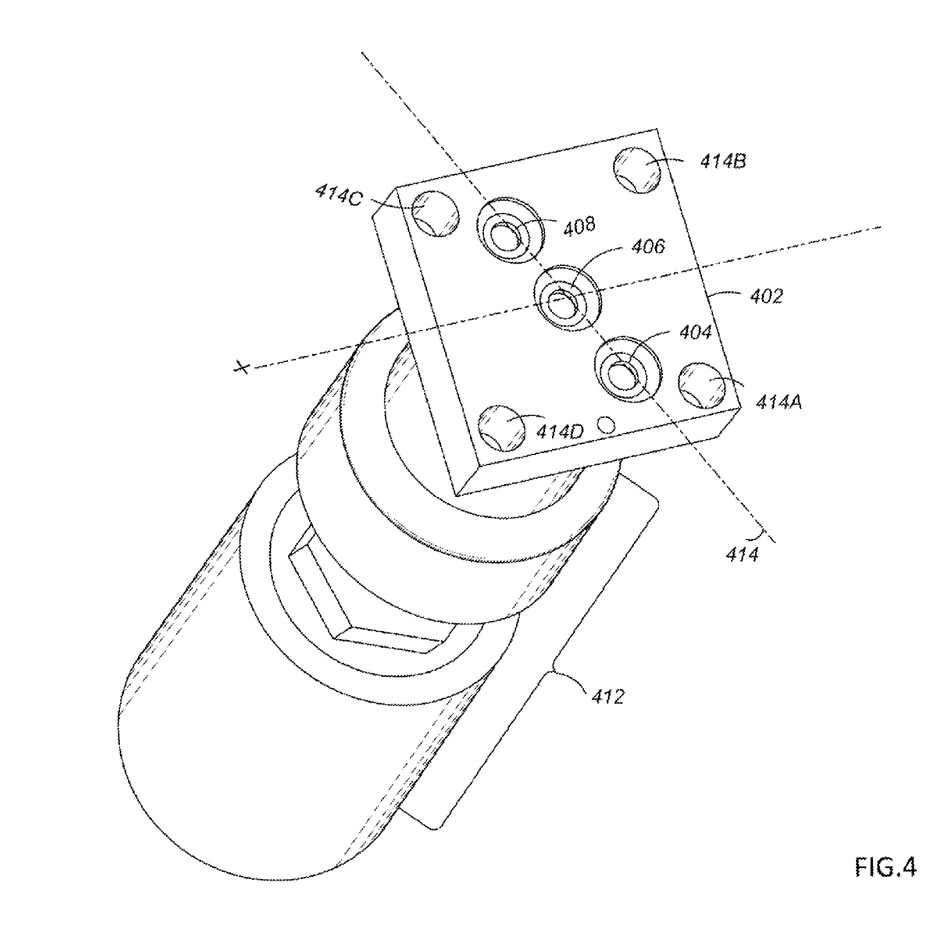
FIG. 4 shows another view of the mixing valve of the type commonly employed in industry.

FIG. 4 shows the three ports 404, 406, and 408 of the mixing valve. Input port 406 is sandwiched between output ports 404 and 408. Together, ports 404, 406, and 408 line up in the direction 414, which is at an angle to the mixing manifold direction X. In other words, the mixing manifolds are oriented in the direction X of FIG. 4, and the ports of a given mixing valve (either all three or the input port to the mixing valve and either of the output ports to the two mixing manifolds) line up along direction 414, which is at an angle (i.e., not orthogonal or parallel) to mixing manifold direction X. This angle may be deemed diagonal or an acute angle (less than 90 degrees) depending on which direction is deemed positive for reference direction X, for example. For completeness, body 412 housing, the valve body and controls is also shown in FIG. 4. Also shown are mounting flange 402 and mounting holes 414A, 414B, 414C, and 414D. In practice, flange 402 of FIG. 4 mates with tubes 252A, 310A, and 250A of FIG. 3 at the plane shown by plane portion 302.

Figure 5:
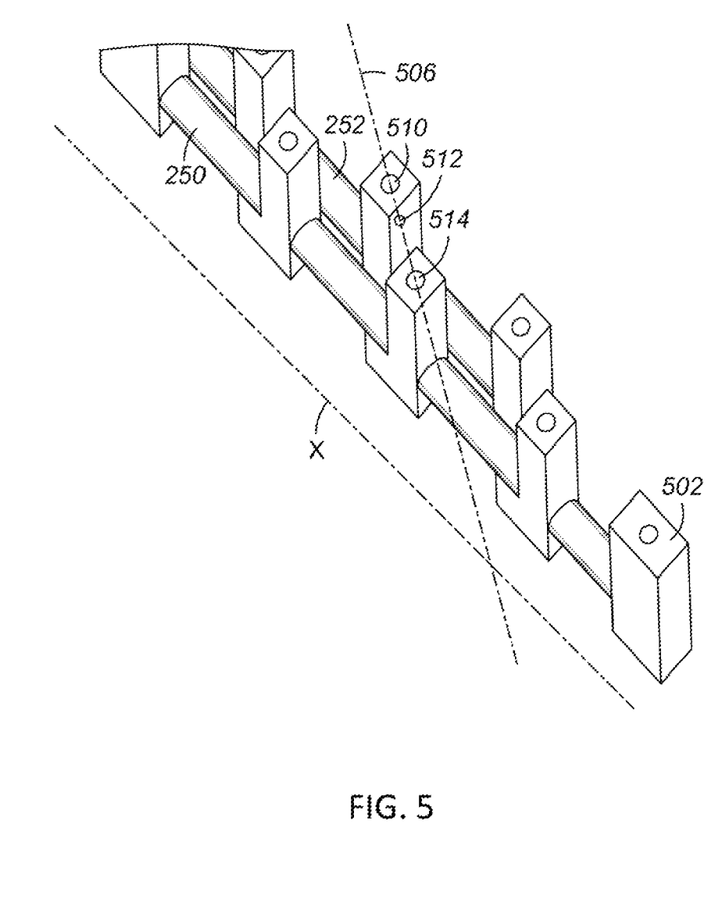
FIG. 5 shows the stagger arrangement of the two weldments forming two mixing manifolds of a shared gas panel.

As can be seen in the example of FIG. 5, the mixing manifolds are parallel and essentially "staggered" such that each set of 3 ports of each mixing valve (1 input port to the mixing valve and 2 output ports to the two mixing manifolds) line up parallel to direction 506. In one or more embodiments, these two mixing manifolds are identical weldment parts to save inventory and manufacturing cost.

Similarly, the input port for the mixing valve that is coupled to mixing manifold input ports 510 and 514 occupy the position denoted by reference number 512. Thus this mixing valve input port and its two mixing valve output ports (coupled to Mixing manifold input ports 510 and 514) line up parallel to direction 506. As mentioned, direction 506 is considered to be "at an angle" with the X direction (which is parallel to the longitude of the mixing manifolds) if they are not orthogonal or parallel to one another.

FIG. 5 also shows a mixing assembly output port 502, representing the port for outputting the mixed process gas to the process module coupled to mixing manifold 250. Another mixing assembly output port (not shown to improve clarity in FIG. 5) is also provided for mixing manifold 252. The output port may be provided at one end of the mixing manifold, or may be provided anywhere along its shared length.

By staggering the mixing manifolds such that the ports of a given mixing valve line up along a direction (such as 506) that is at an angle relative to the mixing manifold longitudinal axis direction X and also vertically displacing components (such that portion 310B occupy a different plane compared to the plane occupied by mixing manifolds 250 and 252 in FIG. 3 and the mixing valves occupy a different plane), it is possible to dispose the input line (such as portion 310A of FIG. 3) to a mixing valve in between the two mixing valve output lines (such as portions 250A and 252A of FIG. 3) and still allow the mixing manifolds to be squeezed together tightly in the Z direction in FIG. 3. This is particularly true if industry-standard mixing valves having its input and output ports lined up in a single line are to be used. If the ports are not angled relative to the mixing manifold longitudinal axis direction and disposed at different planes, such volume-saving arrangement would not have been possible with these industry-standard valves.

As can be appreciated from the foregoing, embodiments of the invention permit a single shared gas panel to selectively provide process gas(es) to a plurality of process modules. By ensuring that each mixing manifold receive the same mass flow, matching issues are eliminated. By reducing the number of gas panels per cluster tool, fewer gas panel components (such as valves, MFCs, connectors, transducers, sensors, etc.) need to be acquired and/or maintained. Further, one or more embodiments of the invention stagger the mixing manifolds (e.g., in the X-Z direction of FIG. 3) and/or vertically displace (e.g., in the Y direction of FIG. 3) the lines that feed the ports of the mixing valves as well as the valves themselves (such that at least 3 planes are involved), the components can be squeezed into a smaller footprint and thus smaller volume, thereby reducing the volume occupied by the gas panel components. When such volume is reduced, less air needs to be pumped and purged, leading to reduced operating cost.

In some plasma processing tools, one or more plasma processing chambers may be employed to perform processes that require gas feeds to multiple zones (i.e., regions) of the chamber. As an example, dielectric etch processes may employ multi-zone gas feeds that provide the process gas to multiple zones in the chamber either simultaneously or at different times. In a specific example, one gas feed may provide the process gas to the center zone of the chamber (such as above the substrate center) while another gas feed may provide the process gas to the edge of the chamber or the edge of the substrate.

In the past, a multi-zone gas feed (MGF) device has been employed to ensure that the process gas is adjustably provided to different chamber zones in the appropriate ratio as required by the recipe. For example, one recipe may require that the center zone receives 80% of the gas flow while the edge zone receives 20% of the gas flow. Another recipe at another time may require that the center zone receives 10% of the gas flow while the edge zone receives 90% of the gas flow.

Generally speaking, the MGF is disposed downstream of the gas panel in a typical prior art plasma processing tool to perform the work of dividing the incoming gas flow into multiple gas flows for multiple zones of the chamber. An example MGF is further discussed in details in a commonly assigned US issued patent entitled "GAS DISTRIBUTION SYSTEM WITH TUNING GAS" by Larson et al. (U.S. Pat. No. 7,169,231 B2, issues Jan. 30, 2007 and incorporated by reference herein.

When a gas panel is shared among, multiple chambers (such as two chambers for the purpose of explanation although more than two chambers can share a single gas panel), the inventors herein have discovered that sharing the MGF among multiple chambers actually is a disadvantageous approach. In a counter-intuitive manner, even though the gas panel may be shared among multiple chambers, optimal operation is achieved if each chamber is provided with its own MGF.

Figure 6:
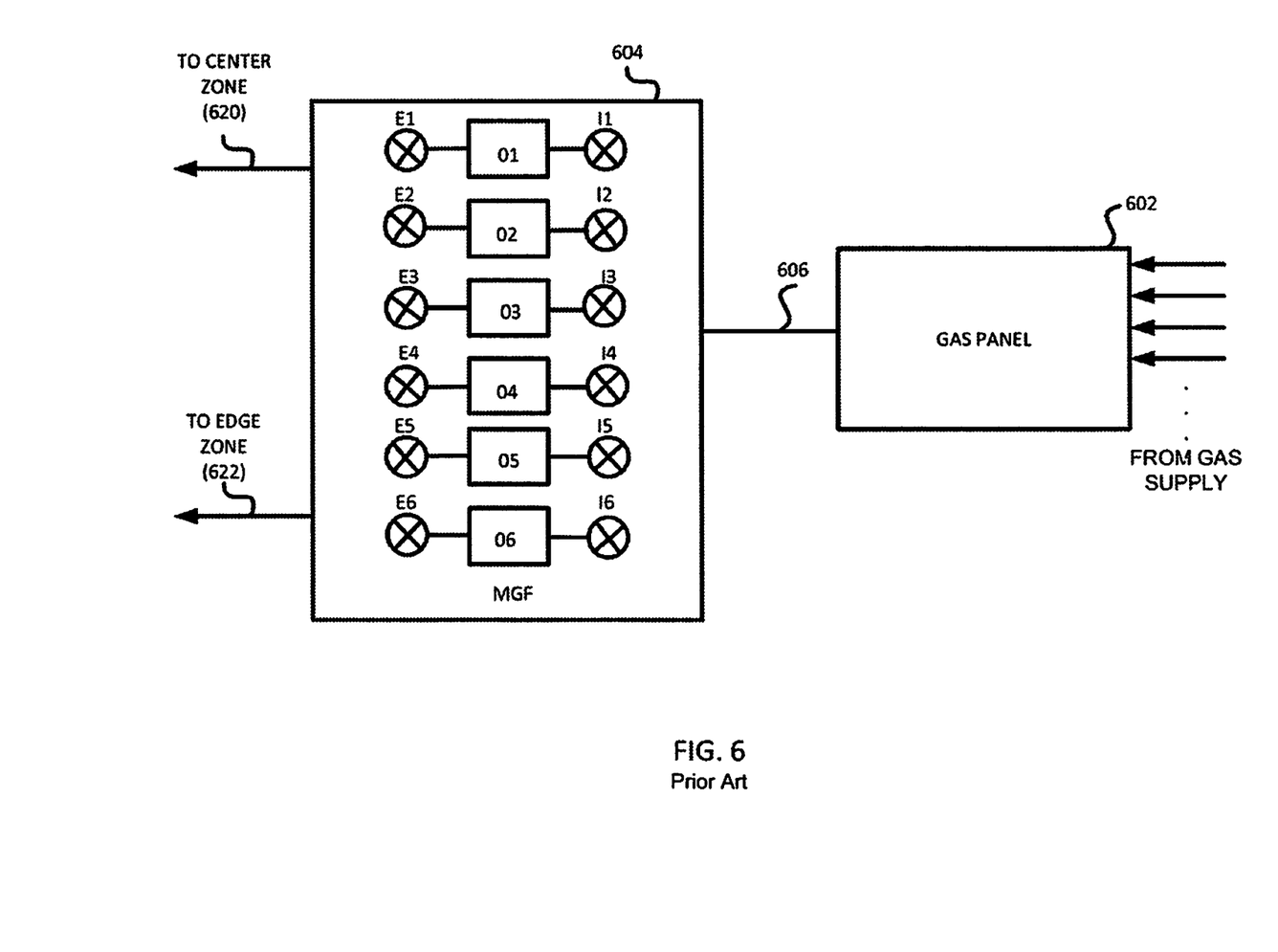
FIG. 6 shows a typical example prior art multi-zone gas feed arrangement to facilitate discussion.

To facilitate discussion, FIG. 6 shows a typical example prior art multi-zone gas feed arrangement whereby the incoming process gas from gas panel 602 is provided to MGF 604. In a simplified explanation, MGF 604 has a plurality of inlet valve-orifice-outlet valve sets, of which six sets are shown in the example of FIG. 6. Thus there is shown an inlet valve I1 that is in fluidic communication with orifice O1, which is in turn in fluidic communication with exit valve E1. Likewise, there is shown an inlet valve I2 that is in fluidic communication with orifice O2, which is in turn in fluidic communication with exit valve E2 and so on.

The process gas from gas feed 606 flows out of gas panel 602 to inlet valves I1-I6. In an embodiment, inlet valves I1-I6 are normally open valves although this is not a requirement. Orifices O1-O6 have different cross-sectional dimensions or orifice sizes to present different flow resistance to the process gas. These orifice sizes are highly precise. In an embodiment, the orifices are made of a jewel material such as ruby to ensure a high degree of accuracy.

Each of exit valves E1-E6 may be selectively opened or closed to control the flow ratio of process gas provided to conduits 620 and 622, thereby controlling the flow ratio of the process gas to the center zone (conduit 620) or to the edge zone (conduit 622). Thus when different combinations of exit valves E1-E6 are closed, different ratios of center flow to edge flow may be obtained. Although only two exit flows (center and edge) are discussed in this example, it should be understood that more than two exit flows may be provided. The MGF is said to adjustably split the incoming mixed gas from the shared gas panel and to adjustably provide (or adjustably flow) different gas flows at different ratios destined for various multi-zone gas feed chambers since various combinations of these valves can be opened and/or closed to achieve different ratios. The valves may be electrically, pneumatically, or mechanically controlled in response to control circuitry to flexibly provide the aforementioned flow ratios to accommodate recipe requirement.

In the past, when a plurality of multi-zone chambers are involved, the temptation and natural approach may be to share a MGF among multiple chambers. One approach to providing the center flow process gas out of conduit 620 to multiple chambers may involve the use of a splitter valve. Likewise, the edge flow process gas out of conduit 622 may be divided into multiple edge flows for multiple chambers by the use of another splitter valve.

Figure 7:
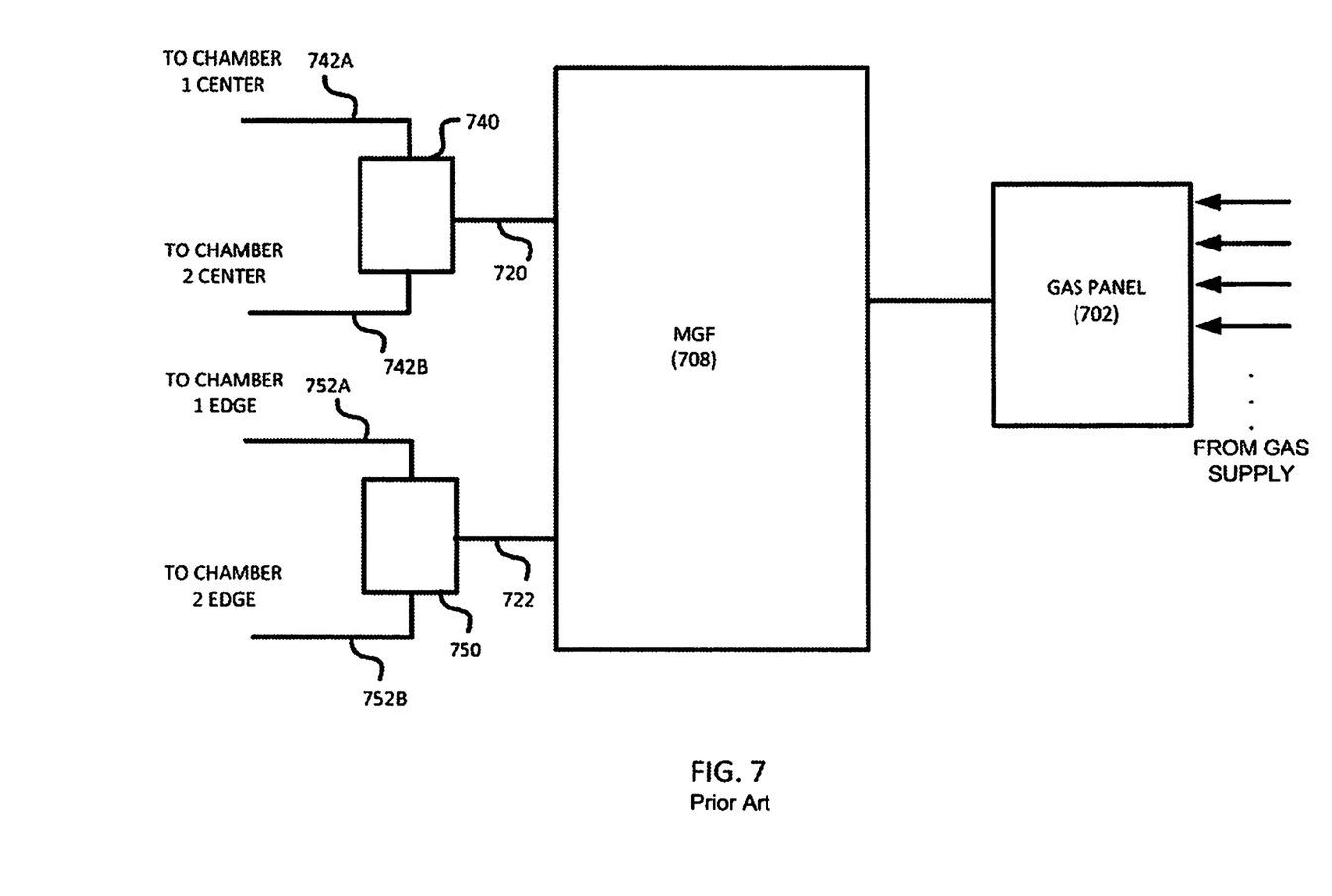
FIG. 7 shows a gas delivery system whereby some multi-zone gas feeds (MGFs) are shared among multiple chambers to facilitate discussion.

This approach is shown in FIG. 7 whereby splitter valve 740 is employed to split the center flow out of MGF 708 (via conduit 720) to two gas flows in conduits 742A and 742B. The gas flow in conduit 742A may be destined for the center zone of the first plasma processing chamber while the gas flow in conduit 742B may be destined for the center zone of the second plasma processing chamber, for example. Likewise, splitter valve 750 is employed to split the edge flow out of conduit 722 to two gas flows in conduits 752A and 752B. The gas flow in conduit 752A may be destined for the edge zone of the first plasma processing chamber while the gas flow in conduit 752B may be destined for the edge zone of the second plasma processing chamber, for example.

While the approach of FIG. 7 may achieve the sharing of MGF 708 among multiple chambers, the inventors herein have discovered that this approach results in several disadvantages. First, in order to provide a given center flow rate to each chamber, MGF 708 must source twice the flow rate (assuming MGF 708 of FIG. 7 is shared between two chambers) so that each chamber would receive the required flow rate after splitting via splitter valves 740 and 750.

Although a MGF is an off-the-shelf part, each MGF is a highly precise device and is manufactured with valves and orifices optimized for a certain pressure range and flow range. The requirement that the MGF handles twice the flow rate and/or twice the input gas pressure would force MGF 708 to operate outside of its optimal ranges, thereby degrading MGF accuracy.

Even if new MGFs can be designed to handle the higher flow/pressure (assuming cost is no consideration since MGF design and qualification is an expensive and time-consuming process), the use of splitter valves 740 and 750 also introduces undesirable inaccuracy since splitter valves are typically much less accurate than MGFs. Thus, while MGF 708 may be able to accurate provide the proper center/edge flow ratio, splitter valve 740 may be unable to evenly split the center flow out of MGF 708 into two equal center flows for the two center zones of the two chambers sharing the MGF. Likewise, splitter valve 750 may be unable to evenly split the edge flow out of MGF 708 into two equal edge flows for the two edge zones of the two chambers sharing the MGF.

Thus, in a counter-intuitive manner, and especially in view of the relatively high cost of the MGF and the desire to share gas delivery system components among multiple chambers, it has been found by the inventors herein that multi-zone gas delivery into each chamber works best if each chamber requiring the multi-zone gas delivery is equipped with its own MGF. Doing so also alleviates the low-flow problem associated with commercially available mass flow controllers, as will be discussed later herein.

Figure 8:
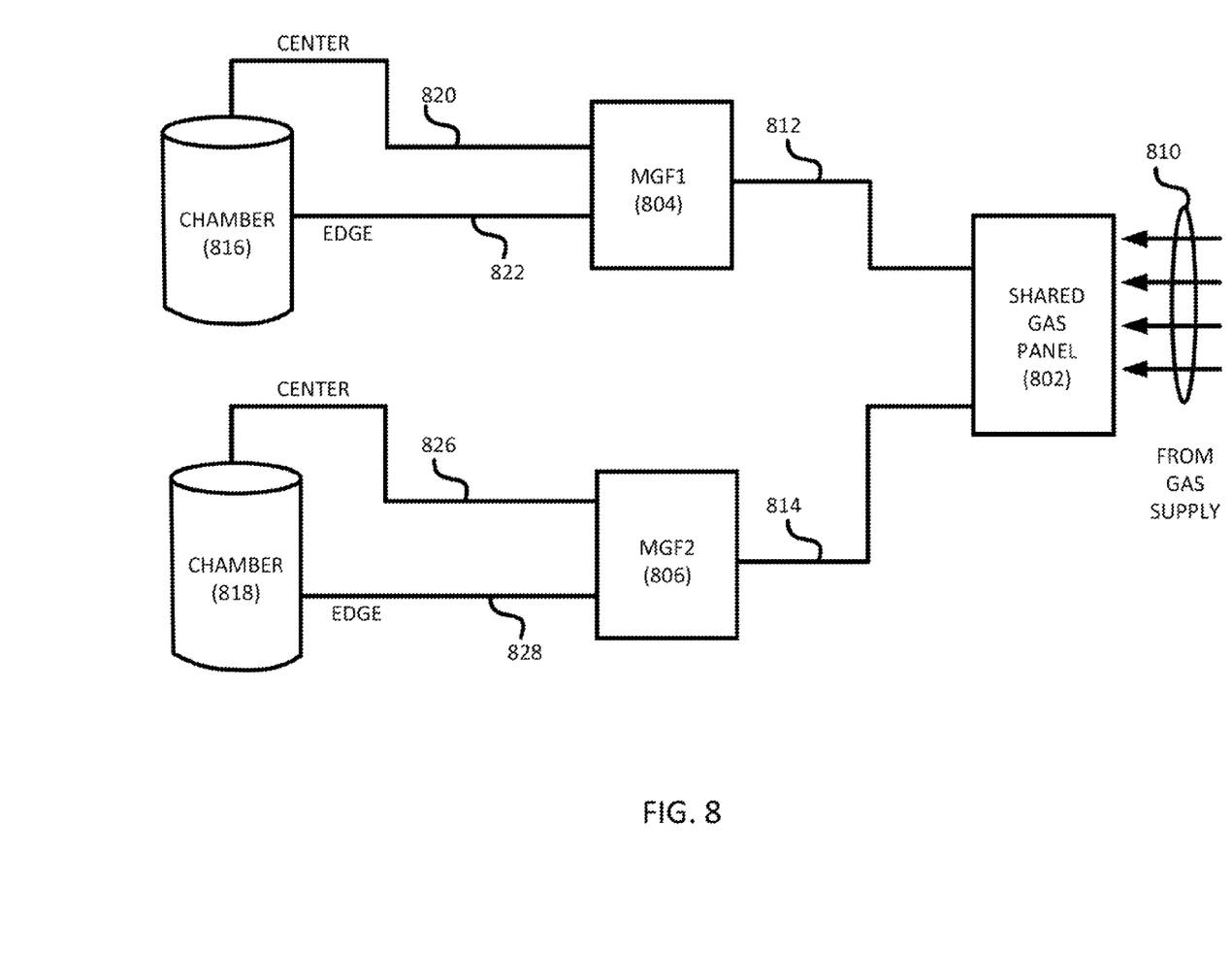
FIG. 8 shows, in accordance with one or more embodiments of the invention, the hybrid approach whereby the gas panel may be shared among multiple chambers to reduce cost while each multi-zone chamber is provided with its own MGF.

FIG. 8 shows, in accordance with one or more embodiments of the invention, the hybrid approach whereby the gas panel may be shared among multiple chambers to reduce cost while each multi-zone chamber is provided with its own MGF. The arrangement of FIG. 8 represents a set of shared gas panel/associated MGFs/associated chambers although there may be multiple such sets in a given cluster plasma tool. As can be seen in FIG. 8, shared gas panel 802 receives different process gases from a plurality of gas conduits 810. The process gases are mixed in the dual manifolds as discussed earlier according to the desired recipe and provided via conduits 812 and 814 to two respective chambers 816 and 818. Since chambers 816 and 818 are multi-zone gas feed chambers (two gas feed zones for each chamber in the example of FIG. 8 although three or more zones are possible), MGFs 804 and 806 are provided downstream of shared gas panel 802.

MGF 804 receives the mixed process gas from shared gas panel 802 (via conduit 812) and performs the dividing of the mixed process gas into various flows destined for various zones of chamber 816. In the example of FIG. 8, MGF 804 may provide for example 70% of the incoming flow from conduit 812 to the center zone of chamber 816 (via conduit 820) and 30% of the incoming flow from conduit 812 to the edge zone of chamber 816 (via conduit 822).

Likewise, MGF 806 receives the mixed process gas from shared gas panel 802 (via conduit 814) and performs the dividing of the mixed process gas into various flows destined for various zones of chamber 818. In the example of FIG. 8, MGF 806 provides 70% of the incoming flow from conduit 814 to the center zone of chamber 818 (via conduit 826) and 30% of the incoming flow from conduit 814 to the edge zone of chamber 818 (via conduit 828).

In this manner, a hybrid approach is achieved whereby although the gas panel 802 is shared between chambers 816 and 818, each chamber is provided with its own MGF (804 and 806) to ensure accurate gas delivery to the various zones of each chamber.

The advantages with the approach exemplified by FIG. 8 are many. For example, as mentioned, it is well-known that each MGF is a highly precise device and is manufactured with valves and orifices optimized for a certain pressure range and flow range. The approach of FIG. 8, unlike that of FIG. 7, does not require the MGF to operate outside of its optimal flow/pressure range. This is because each MGF only handles the gas flow/pressure for its own chamber, which is exactly the situation with current plasma tools in which the gas panels are not shared. Thus existing MGFs can be used without loss of accuracy.

Further, unlike the situation in FIG. 7, it is not necessary to employ (relatively) inaccurate splitter valves (such as splitter valves 740 and 750 of FIG. 7) to accommodate the multi-zone gas feed requirement of the chambers. In the example of FIG. 8, flow accuracy is limited primarily by the MGFs (which tend to be highly accurate due to their highly precise orifice tolerances) and by the shared gas panel design. The shared gas panel also tends to be highly accurate since, as discussed earlier, manifolds and feed lines in the shared gas panel may be optimized such that the shared gas panel can accurately share its incoming gas flow among multiple chambers. For example, the length of the conduits and manifolds and the number of turns and the gas flow resistance to each chamber may be tuned in the shared gas panel such that gas flow sharing is highly accurate (under 0.5% difference in some examples). As a result, the arrangement of FIG. 8 results in a highly accurate gas delivery system to the various zones of the various chambers sharing the shared gas panel. Additionally, since the approach of FIG. 8 accommodates multi-zone gas feed chambers while allowing sharing of the gas panel, the number of mass flow controllers (MFCs) and other costs associated with the gas panel are substantially reduced.

This approach of the example of FIG. 8 also alleviates the low-flow problem associated with off-the-shelf MFCs. The low flow problem occurs when a given recipe requires a low flow rate for a particular type of constituent process gas, typically much lower than the optimal flow range for an off-the-shelf MFC.

For example, some off-the-shelf MFCs may operate optimally for 5-20 sccms (standard cubic centimeters per minute). If the recipe calls for 2 sccm of a particular constituent gas, gas delivery by that MFC and associated conduits tend to be less than accurate since the required gas flow is quite small compared to the optimal flow range for which the MFC is designed.

By sharing a gas panel (and the MFCs within) among multiple chambers, each MFC may handle a greater amount of gas flow since the MFC delivers gas for more than one chamber. In the above example, the MFC may now handle 4 sccm, which is closer to the optimal range and will tend to be more accurate. Further, as discussed, sharing a gas panel also reduces real estate usage (since there will be fewer conduits with fewer gas panels) and lower the environmental remediation cost.

Figure 9:
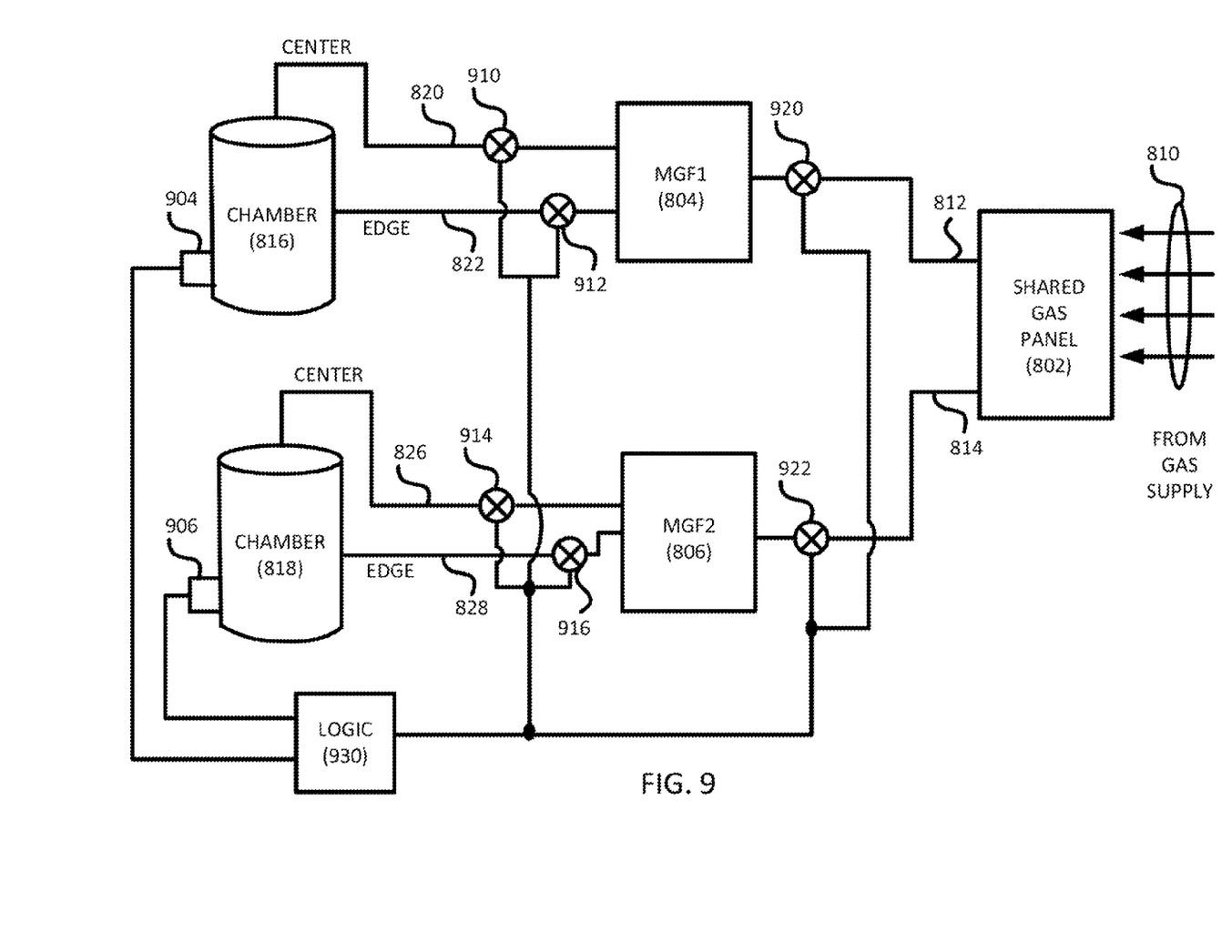
FIG. 9 shows, in accordance with one or more embodiments of the invention, the OES arrangement for performing chamber and/or process matching.

In one or more embodiments, OES (Optical Emission Spectroscopy) may advantageously be used during calibration or during processing in order to match processes and/or match chambers. In this aspect, OES output is used as a feedback signal to control the valves associated with one or more chambers to ensure process matching or chamber matching with another chamber. With reference to FIG. 9, for example, OES sensor 904 may be employed to obtain an OES signal from chamber 816. Likewise, OES sensor 906 may be employed to obtain an OES signal from chamber 818.

If the recipe calls for equal flows in these two chambers, the OES signal from OES sensor 904 should substantially match the OES signal from OES sensor 906. If the OES signals differ (based on an analysis performed by logic 930 which takes as its inputs the OES signals from OES sensors 904 and 906), control signals may be sent to one or more MGF output valves 910, 912, 914 and/or 916 (disposed between the MGF and the chamber) to control the zone flow(s) into the individual chambers. Logic 930 may be dedicated hardware or programmable logic and may include a processor executing computer readable code.

The control strategy may be based on a library of previously acquired OES signals from the chambers to be matched and corresponding valve control settings in order to achieve chamber matching and/or process matching, for example. Alternatively or additionally, valve control settings may be determined algorithmically, taking into account the OES signals from the chambers to be matched and/or other chamber/process parameters from those chambers. In contrast to prior art OES approaches, embodiments of the invention propose looking across multiple chambers and taking into account OES signals from multiple chambers (and optionally other chamber and/or process parameters from multiple chambers) in order to control valve settings, thereby achieving process matching and/or chamber matching among a plurality of chambers. This is different from prior art approaches whereby an OES signal associated with a chamber is used only for process control of that chamber, and OES signals from other chambers are not taken into account in that process control.

Control signals from logic 930 may also be sent to MGF input valves 920 and/or 922 (disposed between the MGF and the shared gas panel) to improve chamber matching and/or process matching. Although not shown in FIG. 9, control signals from logic 930 may alternatively or additionally be sent to individual MGF inlet valves or individual MGF outlet valves associated with individual inlet valve-orifice-outlet valve sets (e.g., valves I1, I2, E1, or E2 in the example of FIG. 6) in order to more finely control chamber/process matching.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, although the apparatus is described in the example, the invention also covers methods for providing, making and/or assembling the apparatus by coupling the components together to form the structure described or for operating the plasma processing system by operating the apparatus to employ its intended functionality and advantages. Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A gas supply delivery arrangement for supplying process gas to a plurality of multi-zone gas feed chambers of a plasma processing system, comprising:
   a plurality of gas supply conduits;
   a shared gas panel coupled to receive different gases from said plurality of gas supply conduits, said shared gas panel mixing said different gases to create mixed gas and evenly splitting said mixed gas to supply a portion of said mixed gas to each of said plurality of multi-zone gas feed chambers, wherein said shared gas panel is configured to output each of said portions of said mixed gas from the shared gas panel via different respective conduits;
   a plurality of multi-zone gas feed devices comprising at least two multi-zone gas feed devices coupled downstream of said shared gas panel, each of said plurality of multi-zone gas feed devices configured to (i) separately receive, directly from said shared gas panel via said different respective conduits, said portion of said mixed gas, and (ii) adjustably split said portion of said mixed gas received by each of said plurality of multi-zone gas feed devices from said shared gas panel into a plurality of gas zone flows destined for different zones of a multi-zone gas feed chamber of said plurality of multi-zone gas feed chambers;
   first respective valves disposed between each of said plurality of multi-zone gas feed devices and said shared gas panel;
   second respective valves disposed between each of said plurality of multi-zone gas feed devices and said plurality of multi-zone gas feed chambers; and
   logic for receiving optical emission spectroscopy signals from at least two multi-zone gas feed chambers of said plurality of multi-zone gas feed chambers and for providing a control signal to said first respective valves and said second respective valves based on said received optical emission spectroscopy signals.

2. The gas supply delivery arrangement of claim 1 wherein said each of said plurality of multi-zone gas feed devices provides a portion of said mixed gas to a single multi-zone gas feed chamber of said plurality of multi-zone gas feed chambers.

3. The gas supply delivery arrangement of claim 1 wherein said plurality of multi-zone gas feed chambers consists of two multi-zone gas feed chambers.

4. The gas supply delivery arrangement of claim 1 wherein a first zone of said different zones represents a center portion of a given multi-zone gas feed chamber of said plurality of multi-zone gas feed chambers, a second zone of said different zones represents an edge portion of said given multi-zone gas feed chamber of said plurality of multi-zone gas feed chambers.

5. The gas supply delivery arrangement of claim 1 wherein said plasma processing system represents a dielectric plasma etch system.

6. The gas supply delivery arrangement of claim 1 wherein at least one of said multi-zone gas feed chambers represents an inductively coupled plasma processing chamber.

7. The gas supply delivery arrangement of claim 1 wherein at least one of said multi-zone gas feed chambers represents a capacitively coupled plasma processing chamber.

8. The gas supply delivery arrangement of claim 1, wherein a first multi-zone gas feed device of said plurality of multi-zone gas feed devices includes a plurality of orifices having different orifice sizes.

9. The gas supply delivery arrangement of claim 8 wherein said first multi-zone gas feed device of said plurality of multi-zone gas feed devices further includes a plurality of exit valves coupled downstream of said a plurality of orifices, selective combinations of individual ones of said plurality of exit valves, when open, generate different flow ratios for different zones of a multi-zone gas feed chamber.

10. A gas supply delivery arrangement for supplying process gas to a plurality of multi-zone gas feed chambers of a plasma processing system, comprising:
    a plurality of gas supply conduits;
    first means coupled to receive different gases from said plurality of gas supply conduits, said first means mixing said different gases to create mixed gas and evenly splitting said mixed gas to supply a portion of said mixed gas to each of said plurality of multi-zone gas feed chambers, wherein said first means is configured to output each of said portions of said mixed gas from the first means via different respective conduits;
    a plurality of multi-zone gas feed devices comprising at least two multi-zone gas feed devices coupled downstream of said first means each of said plurality of multi-zone gas feed devices configured to (i) separately receive, via the different respective conduits, said portion of said mixed gas, and (ii) adjustably split said portion of said mixed gas received by each of said plurality of multi-zone gas feed devices from said first means into a plurality of gas zone flows destined for different zones of a multi-zone gas feed chamber of said plurality of multi-zone gas feed chambers;

first respective valves disposed between each of said plurality of multi-zone gas feed devices and said first means;
second respective valves disposed between each of said plurality of multi-zone gas feed devices and said plurality of multi-zone gas feed chambers; and
logic for receiving optical emission spectroscopy signals from at least two multi-zone gas feed chambers of said plurality of multi-zone gas feed chambers and for providing a control signal to said first respective valves and said second respective valves based on said received optical emission spectroscopy signals.

* * * * *